(12) United States Patent  (10) Patent No.: US 6,874,788 B2
Kono  (45) Date of Patent: Apr. 5, 2005

(54) STRIP BUSH SEAL

(75) Inventor: Toru Kono, Saitama (JP)

(73) Assignees: Eagle Engineering Aerospace Co., Ltd., Tokyo (JP); Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/848,376

(22) Filed: May 19, 2004

(65) Prior Publication Data

US 2004/0232621 A1 Nov. 25, 2004

(30) Foreign Application Priority Data

May 20, 2003 (JP) .................................. 2003-141578

(51) Int. Cl.[7] ........................... F16J 15/48; F01D 11/00
(52) U.S. Cl. ...................................... 277/355; 277/412
(58) Field of Search ................................ 277/355, 411, 277/412; 415/174.2, 174.5; 29/888.3

(56) References Cited

U.S. PATENT DOCUMENTS

| 2,233,579 | A | * | 3/1941 | Bowers | 92/221 |
|---|---|---|---|---|---|
| 5,135,237 | A | * | 8/1992 | Flower | 277/355 |
| 6,062,463 | A | * | 5/2000 | Hoffmueller et al. | 228/212 |
| 6,109,616 | A | * | 8/2000 | Mayr | 277/355 |
| 6,267,381 | B1 | * | 7/2001 | Wright | 277/355 |
| 6,343,792 | B1 | * | 2/2002 | Shinohara et al. | 277/355 |
| 6,736,597 | B2 | * | 5/2004 | Uehara et al. | 415/174.2 |

* cited by examiner

Primary Examiner—Alison Pickard
Assistant Examiner—Visha Patel
(74) Attorney, Agent, or Firm—Arent Fox PLLC

(57) ABSTRACT

A strip brush seal device for improving a seal capability of a seal portion, promoting an elastic deformation of the seal portion, and preventing wear of the seal portion. Also for providing a secure joint to a mounting portion of the strip seal brush. The strip brush seal comprises a mounting portion which is located toward the side of protrusions of individual seal strips in which the protrusions of the seal strips are integrally joined along a direction of width of the strip, a strip brush seal which retains a seal portion to the radially inward direction relative to the mounting portion, a back plate which is disposed in the opposite side of the action of a process fluid, and a joint portion which is formed by welding the individual protrusions of the seal strips.

5 Claims, 16 Drawing Sheets

STRIP BUSH SEAL

BACKGROUND OF THE INVENTION

1. Field of the Invention

The present invention relates generally to a strip brush seal arrangement to effect a seal between a rotary shaft of a compressor, gas turbine engine, refrigerator, pump or the like, and a relatively rotating element. More particularly, this invention relates to a technical domain of strip brush seals in which a mounting portion bundling thin strips are securely attached for an improved seal capability of a seal portion and a resilient flexibility provided to the seal portion effectively prevents wear of the seal portion.

2. Description of the Related Art

Related art of the present invention is found as a strip brush seal 100 disclosed in U.S. Pat. No. 6,343,792. In the strip brush seal 100 of FIG. 15, a plurality of circular-arc thin strip brushes 109, also called "leaves", are densely packed around the circumference of a shaft 120 in order to inhibit a flow between a high pressure region P1 and a low pressure region P2.

A plurality of the strip brushes 109 are integrally bundled at mounting portions 104 of the strip brushes 109 by means of an annularly-shaped outer perimeter surface which is defined as a soldering portion 105. The mounting portions 104 which form an annulus as a whole are installed in a groove of a housing 110. A back plate 102 is disposed on one side of the strip brushes 109 which is in the lower pressure region P2 whilst a retainer plate 103 is disposed on the other side which is in the higher pressure region P1. The back plate 102 and the retainer plate 103 provide supports on the both sides of the strip brushes 109, and the back plate 102 effects a seal against a fluid located in the higher pressure region P1. At the same time, a seal against leakage of the fluid between the back plate 102 and the rotary shaft 120 is effected by a plurality of the strip brushes 109 which are densely packed to form the annular shape.

However as the strip brush 109 is made rather rigid, the free end surface of the strip brush 109 fits with the outer diameter surface of the rotary shaft 120 with a relatively large clearance therebetween. The fit clearance makes it difficult to effect a seal against the fluid. Also the large clearance between the strip brush 109 and the rotary shaft 120 imposes another difficulty on the positional alignment of the clearance because of which assembly task of the strip brush 109 takes a long time. In addition, manufacture of the strip brush 109 not only requires cutting of a rectangular strip from a thin metal sheet of 0.1 mm thickness but also needs a uniform bending of all the strips into an identical circular-arc form along the direction of arrangement. This bending process requiring high precision is likely to increase the production cost because of the difficulty in handling of such a thin sheet material.

Furthermore soldering of the mounting portion 104 at the outer perimeter surface emits substantial heat so that it becomes difficult to achieve an accurate position of the strip brush 109 in order to keep the annularly-shaped array of the mounting portions 104. In particular, for the strip brushes 109 being piled to an annular shape in which the strip brushes 109 of uniform thickness are in use, an inter strip gap in the outer circumference region differs from that in the inner circumference region. This necessitates the use of spacer elements at the outer circumferential region to compensate the gap difference. Deployment of such spacer elements in the gaps between the individual strip brushes 109 further increases the complexity of the assembly process.

Further related art of the present invention is found as a strip brush seal 150 of another example in the same patent. The strip brush seal 150 is illustrated in FIG. 16.

Strip brush seal 150 shown in FIG. 16 has a similar arrangement to the strip brush seal 100 of FIG. 15. Differences between the strip brush seal 150 of FIG. 16 and the strip brush seal 100 of FIG. 15 are explained below. Strip brushes 180 are arranged to an annular shape in the strip brush seal 150 wherein six protrusions 180A are disposed on the surface of the outer perimeter region of the individual strip brushes 180 so that the protrusions 180A provide a certain clearance gap between adjacent strip brushes 180. The clearance gap given by the protrusions 180A, however, makes soldering at the outer perimeter surface more difficult because of the gap being present between the successive strip brushes 180. In order to alleviate this problem, mounting portions 190 located at the outer perimeter of the strip brushes 180 need to be fitted to a groove portion 160C of an annularly-shaped body element 160.

As the strip brush 180 has a rectangular shape, it is not straightforward to accurately fit the strip brush 180 to the groove portion 160C of the annularly-shaped body element 160 whose side-walls are defined by a support portion 160A and a back plate portion 160B. Also when the strip brush 180 is mounted in the groove portion 160C, both distal edge corners 180C, 180C of the strip brush 180 are apt to scratch the surface of the rotary shaft 120. In order to avoid the problem, the corners need to be made round but the nature of the thin sheet material makes it difficult.

In addition a process fluid partially leaks through the protrusions 180A toward the outer perimeter side of the strip brush 180, which further continues to leak along the groove portion 160 and reduces the seal capability after all. Also the annularly-shaped body element 160 is comprised of a plurality of circular-arc segments which are circumferentially divided in order to densely pile the individual strip brushes 180 onto the groove portion 160C. The assembly process of the individual segments to an annularly-shaped integral structure via joint surfaces becomes inevitably complex from the viewpoint of effecting a seal against the fluid because of the presence of the protrusions 180A disposed on the strip brushes 180. This in turn makes difficult the installation of the annularly-shaped body element 160 into the groove portion 160C of a housing 170. As a consequence, the overall manufacture and assembly cost of the strip brush seal 150 will increase.

In the strip brush seal 100 wherein a plurality of thin strip brushes 109 are, as described above, integrally arranged to form an annular shape, the thermal deformation of the strip brush 109 during the soldering process at the mounting portion 104 located in the outer perimeter side produces uneven arrangement of the free-end edges of a plurality of the strip brushes 109, which affects the seal capability between the strip brushes 109 and the rotary shaft 120. The soldering process is applied over the outer perimeter surface of the strip brushes 109. However, the soldering over the outer perimeter surface causes a problem that the soldering strength somewhat diminishes against the force exerted from the free-end edge of the strip brush 109. Also in case of a unit segment which consists of a plurality of strip brushes 109 welded together, a difficulty in obtaining a uniform contact at the joint surfaces of the individual unit segments causes a decline of the seal capability at the joint surfaces as well as an increase of the assembly time. Furthermore if the strip brushes 109 are densely piled with no clearance gap therebetween to form an annular body, the individual strip brushes 109 collectively behave as a solid body with little flexibility, and when the rotary shaft 120 rotates relative to the strip brushes 109 being in contact therewith, the both elements are subjected to friction against each other and prone to wear due to the friction.

In the strip brush seal 150, as another example wherein protrusions 180A are disposed on the strip surface in the mounting portion 190 of the strip brush 180, the gaps created between adjacent strip brushes 180 make it difficult to solder evenly the outer perimeter surface of the strip brushes 180 thus arranged. In order to alleviate the problem, an annularly-shaped body element 160 is employed for fixating the strip brushes 180. However fixation of the mounting portions 190 of the strip brushes 180 is quite difficult. Also the annularly-shaped body element 160 needs to be constructed as an assembly of unit segments of circular-arc. Therefore problems remain in the assembly and the seal capability at the joint surfaces between the successive unit segments.

The present invention is introduced to alleviate the above mentioned problems. A primary technical goal which this invention tries to achieve is to improve the joint strength at the mounting portion of a strip brush, to enhance the elastic deformation of the strip brush by establishing a clearance gap between the adjacent surfaces of the arranged strip brushes, and to improve the seal capability of the seal portions. Another goal is to reduce the production cost of a strip brush seal. Yet another goal is to prevent soldering or welding at the mounting portion of a strip brush seal from causing the uneven arrangement of strip brushes and to avoid the deformation of thin strip brushes due to soldering or welding.

SUMMARY OF THE INVENTION

A primary object of the present invention is to resolve the above mentioned technical problems, and a technical means in relation with a first preferred embodiment of the present invention is realized as follows.

According to the present invention there is provided a strip brush seal device for effecting a seal between two relatively moving components. The strip brush seal device comprises a seal strip being made of a rectangular thin strip which has protrusions thereon, the protrusions disposed at both ends along a direction of width of the thin strip, a strip brush seal arranging a plurality of the seal strips in a successive manner by means of the protrusions of the seal strips being joined along the direction of arrangement, a back plate being disposed on the opposite side of a process fluid, the fluid acting on the strip brush seal, a mounting portion being disposed in the strip brush seal and having a joint portion wherein the strip brush seal is integrally welded with adjacent strip brushes along the protrusions, and a seal portion being disposed in the strip brush seal and located toward the radially inward relative to the mounting portion, the seal portion having a smaller inter strip gap than an inter strip gap disposed at the mounting portion.

In the strip brush seal device related to the present invention, when seal strips, for example, are arranged to form an annular shape, there remains a clearance gap at the outer diameter side while the surfaces of the seal strips located at the inner diameter side come in contact with each other. However, concatenating the protrusions of the individual seal strips constitutes, regardless of the inter strip gap, a line or belt formed by the ridges of the protrusions on the side edge of the mounting portion of the strip brush seal. Soldering or welding along the line or belt of the ridges of the protrusions results in an easy assembly of the seal strips to obtain a joint portion. Also since the strip brush seal can be fixedly assembled while the seal portion is arranged to a tiny inter strip gap, not only the thickness of the seal strip can be made small but also a resilient flexibility can be provided to the seal strip. Furthermore even if the thickness of the seal strip in use is thin, welding on the side edge of the mounting portion does not cause thermal deformation and an orderly arrangement of the seal portion is achieved. Also the inter strip gap of the seal portion provides a significant elastic deformation and prevents wear due to a contact against the rotary shaft.

Since the joint portion is fabricated by welding the protrusions from the side direction of the mounting portion of a strip brush seal, not only the welding process of the joint portion is straightforward but also irregularity or thermal deformation to the arrangement of the strip seals in welding is effectively prevented. This enables use of extremely thin seal strips and its elastic deformation in response to a contact of the seal portion against the rotary shaft effectively prevents wear due to friction. In addition it allows a great number of thin seal strips to be disposed, which yields an improved seal capability in the seal portion. Also when the height of the protrusions is decreased in the direction from the outer circumference to the inner circumference the inter strip gap at the inner circumference of the seal strip can be made arbitrarily small. Therefore an optimal design of the inter strip gap becomes possible. In this way, the whole resilient flexibility of the seal portion can be enhanced and the seal capability of the seal portion, by means of an optimal arrangement of the inter strip gap, is effectively improved.

Furthermore the seal capability is effectively improved since a seal portion can be made at an angle either by making the whole seal strip at an angle or by bending the seal strip at an inflection point between the mounting portion and the seal portion. No matter whichever arrangement may be used for seal strips the both ends of the protrusions are welded to form a joint portion. Therefore not only a secure attaching force of the mounting portion is achieved but also a significant seal capability is provided.

DETAILED DESCRIPTION OF THE INVENTION

Described below is details of the figures of preferred embodiments of a strip brush seal constructed in accordance with the principles of the present invention. All the figures explained below are constructed according to actual design drawings with accurate dimensional relations.

Figure 1:
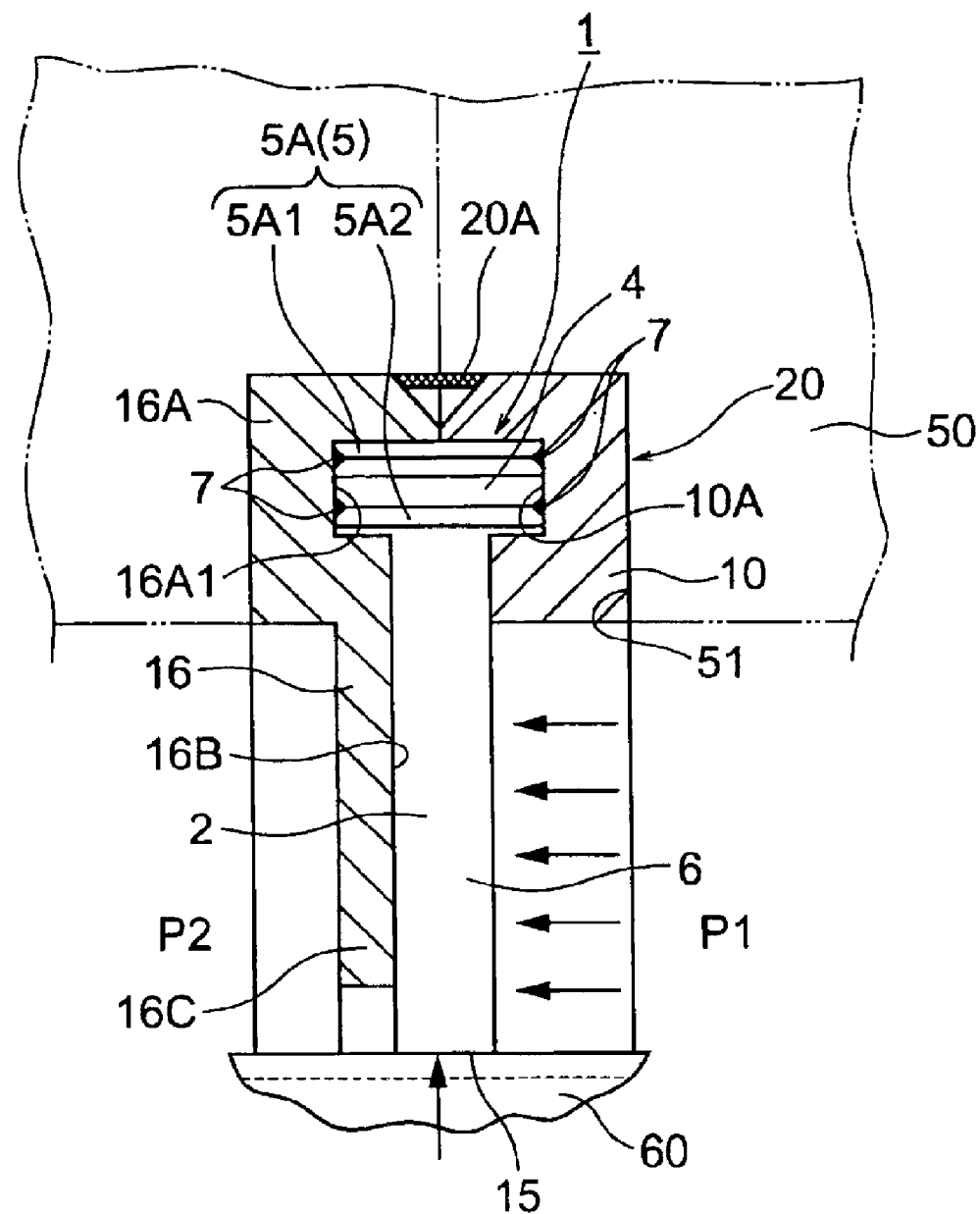
FIG. 1 is a half cross section of a strip brush seal in an axial direction as a first example according to the present invention.

FIG. 1 shows a strip brush seal as a first example related to the present invention. The first example will be explained below according to FIG. 1 through FIG. 6.

Figure 2:
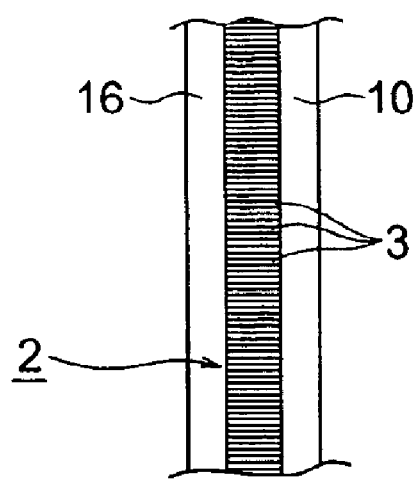
FIG. 2 is a partial plan view of the strip brush seal of FIG. 1 when viewed from radially inward direction.

FIG. 1 shows a strip brush seal 1 mounted in a housing 50 of a gas turbine engine in order to separate a high pressure region P1 from a low pressure region P2 within a chamber located between the housing 50 and a shaft 60. FIG. 2 is a portion of a plan view of the strip brush seal 1 in FIG. 1 when viewed from the radially inward direction.

Figure 3:
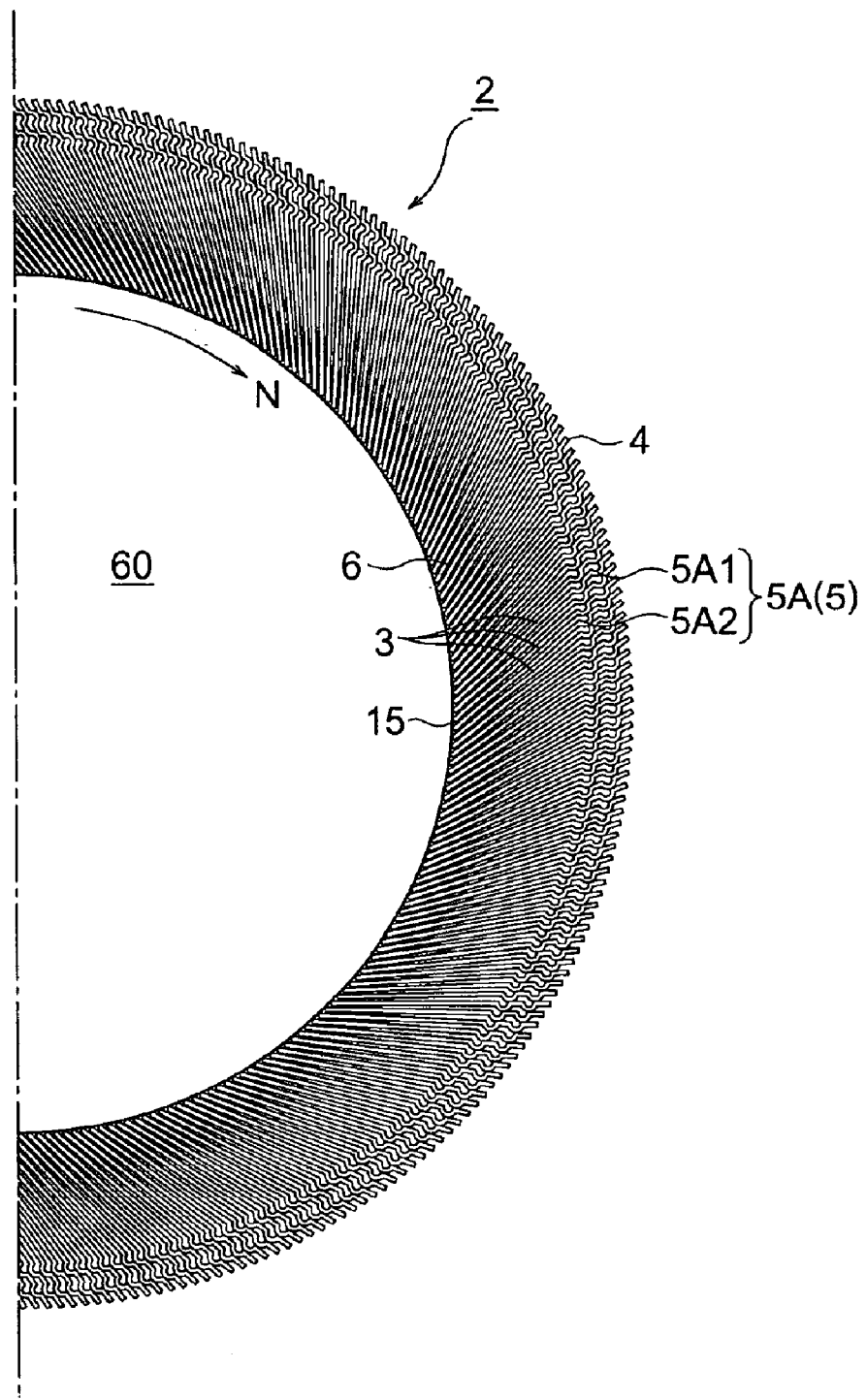
FIG. 3 is a half plan view of the strip brush seal of FIG. 1 related to the present invention.

In FIG. 1 and FIG. 2, the shaft 60 extends through a bore of the housing 50 with a clearance gap therebetween wherein the housing 50 is represented by a double-dotted line. The shaft 60 and the housing 50 are subject to relative movement. Strip brush seal 2, as shown in FIG. 3, consists of a plurality of thin seal strips 3 and a mounting portion 4 wherein the seal strips 3 are arranged at an angle to the outer diameter surface of the shaft 60 so as to form an annular shape and the mounting portion 4 is located at the outer perimeter of the annular shape. The mounting portion 4 may as well be directly installed to an annularly-shaped groove portion 51 of the housing 50. Radially inward region of the strip brush seal 2 defines a seal portion 6 wherein a plurality of seal strips 3 are disposed. In addition a free end surface 15 of the seal portion 6 fits with the outer diameter surface of the shaft 60 either with a small clearance gap therebetween, in close proximity, or in contact with each other. The seal portion 6 of the strip brush seal 2 thus provides an effective seal against a process fluid between the housing 50 and the shaft 60.

Figure 5:
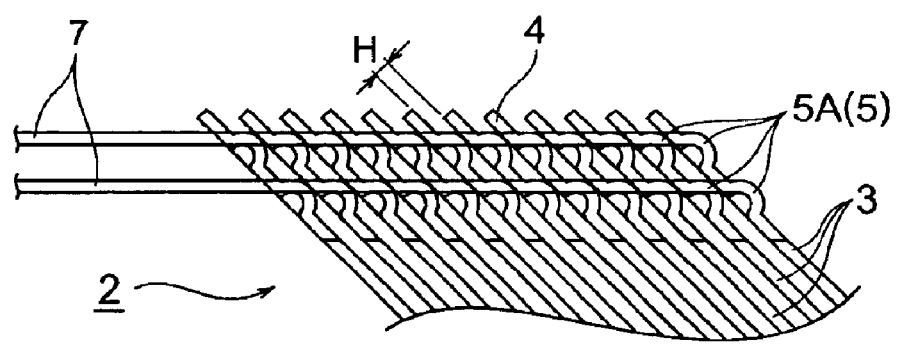
FIG. 5 is a side view of a portion of successive protrusions forming a line along which the protrusions in the mounting portion of the strip brush seal related to the present invention are welded to form a joint portion.

The strip brush seal 2 in FIG. 5 appears like a straight line since it is an enlarged view. A thin seal strip 3 is illustrated to the right of FIG. 6, and a plurality of such seal strips 3 held at an angle relative to the outer diameter surface of the shaft 60 are piled in such a way that the strips as a whole form a circular shape. The mounting portion 4 of the seal strip 3 retains protrusion portions 5 (continuous protrusion portions 5A) which constitute straight ridges over the full width of the strip 3 wherein the ridge is fabricated by partially bending the strip to form a circular or semi-circular contour. Although the protrusion portions 5 in FIG. 6 have two threads, a single thread or triple threads can be used instead. The number of thread may be determined based on the consideration on the strength of the welded portion wherein the protrusion portions 5 are integrally welded at the side of the protrusions along the line of arrangement in order to unify a plurality of mounting portions 4.

Height of the protrusion portions 5 is chosen in such a way that radially inward surfaces of the seal portions 6 of the individual seal brushes 3 come in contact or in close proximity relative to each other. The height of the protrusion portions 5, being dependent on the radial dimensions of the strip brush seal 2, can be $10^{-6}$ m, for instance. Dimension of the clearance gap between the surfaces of the seal portions 6 in the seal strips 3 thus arranged affects the seal capability against a process fluid. Also the gap between the adjacent surfaces of the seal strips 3 is arranged in such a way that the seal strips 3 exhibit a flexibility when the seal portions 6 come in contact with the rotary shaft 60. The smaller the inter strip gap is, the more the seal performance is exhibited. At the same time, however, flexibility of the seal strips 3 is worsened. On the other hand, increasing the inter strip gap leads to a decrease in seal capability as well as an improvement of resilient flexibility. The present invention is to provide an optimal means of rigidly fixating the clearance gap between the individual seal strips 3 according to the experimental observations.

The strip brush seal 2 can be installed to a groove portion 51 of a housing 50 for effecting a seal against the fluid without using a back plate 16 shown in FIG. 1. However in order to improve the seal capability of the strip brush seal 1, it is preferable to dispose ring-shaped back plates 16 both on the side which the fluid acts on and its opposite side. The back plate 16 disposes a mount groove portion 16A1 on a back surface 16B of an outer perimeter portion 16A wherein the mounting portion 4 is engaged in the mount groove portion 16A1. Also a radially inward portion 16C of the back plate 16 fits with the rotary shaft 60 with a clearance gap therebetween. The inner diameter surface of the radially inward portion 16C is made larger than the outer diameter surface of the rotary shaft 60 such that excursions of the rotary shaft 60 in the radial direction are tolerated. The back surface 16B of the back plate 16 provides the strip brush seal 2 with a support against the fluid pressure and also prevents the fluid from leaking between the arranged surfaces of the individual seal strips 3 of the strip brush seal 2.

A retainer plate portion 10 disposes a mount groove portion 10A which is arranged symmetrically to the back plate 16 with respect to the strip brush seal 2 wherein the mount groove portion 10A is similar to the mount groove portion 16A1 of the back plate 16. This mount groove portion 10A is engaged with the mounting portion 4 to hold the mounting portion 4. A protrusion located on the outer perimeter side of the back plate 16 and another protrusion located on the outer perimeter side of the retainer plate portion 10 are oppositely made in contact to form a contact surface wherein the outer perimeter portion of the contact surface is welded. The welded portion is defined as a joint portion 20A and the whole radially outward portion is defined as a fixing portion 20 which is mounted to the housing 50. As an alternative means to obtain the fixing portion 20, an O-ring can be disposed around the contact surface between the back plate 16 and the retainer plate portion 10 without welding at the outer perimeter portion between the back plate 16 and the retainer plate portion 10. The fixing portion 20 consisting of the back plate 16 and the retainer plate portion 10 being in contact with each other, is installed in the groove portion 51 of the housing 50.

Figure 4:
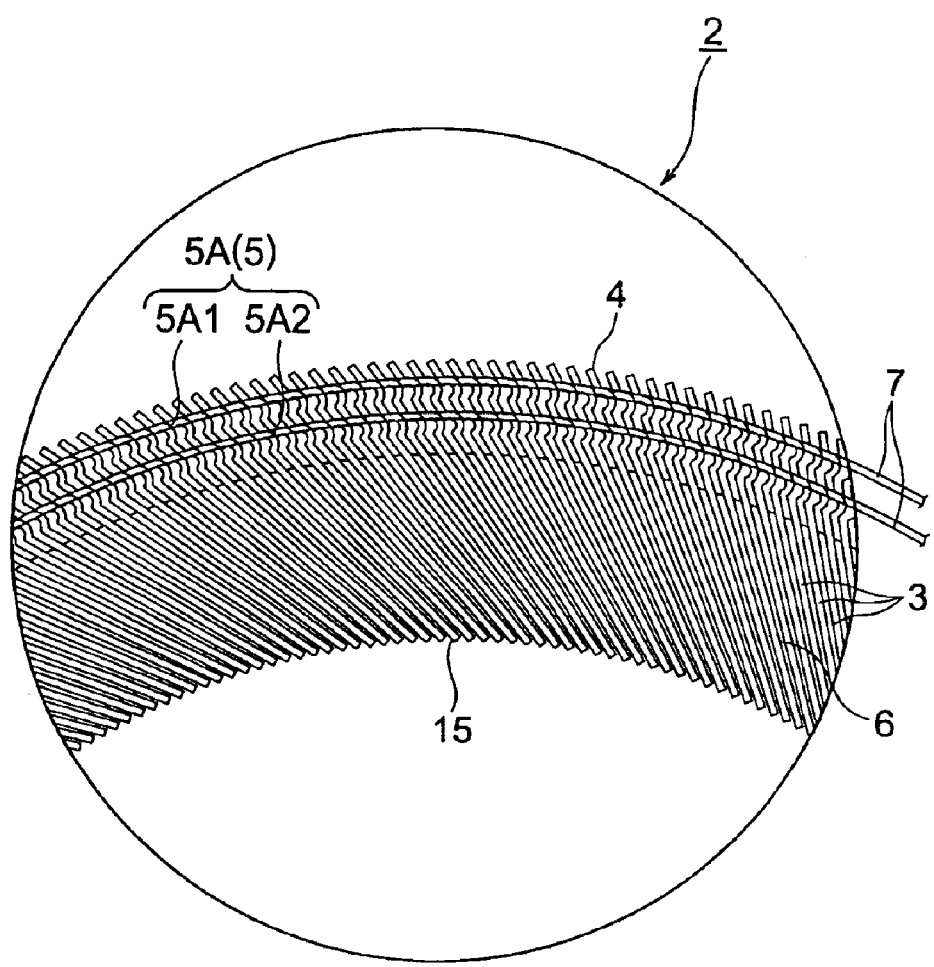
FIG. 4 is an enlarged view of a portion of the strip brush seal of FIG. 3.

FIG. 3 is a plan view for the right half portion of the strip brush seal 2 in FIG. 1. FIG. 4 is an enlarged view of a portion of FIG. 3. In addition FIG. 5 is a plan view illustrating a portion of the mounting portion in the strip brush seal 2 of FIG. 3. As shown in FIG. 3, a plurality of thin strip brushes 3 of a rectangular shape which are arranged at an angle relative to the rotary direction N of the shaft 60, are densely piled along the diameter surface of a rotary shaft 60 to form an annularly-shaped body. The side surface of the mounting portion 4 of the strip brush seal 2, as seen in FIG. 4 and FIG. 5, is welded along the line connecting the ridges of the protrusions 5 and two threads of connection bridges 7 are formed (Note that the connection bridge 7 extends to the right in FIG. 4 and to the left in FIG. 5).

The protrusions 5 disposed on the arranged surfaces in FIG. 1 through FIG. 6 span the full width of the mounting portion 4 in a straight manner. The protrusions 5 thus arranged are called continuous protrusions 5A as an example of protrusions 5. If the protrusions 5 are disposed at least at the both ends of the mounting portion 4, welding of the protrusions at the side edges of the mounting portion 4 is made possible without having protrusions between the edges. Furthermore the protrusions 5 can be fabricated not only by bending but also by alternative deposition methods including chemical processes such as etching or deposit.

Figure 6:
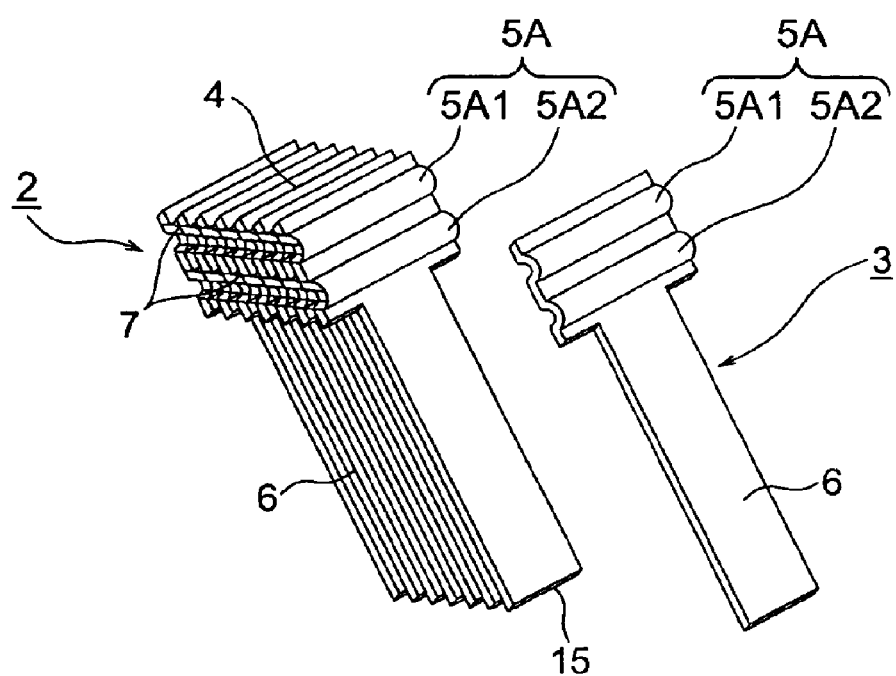
FIG. 6 is an oblique view of a divided segment block of the strip brush seal of FIG. 1.

As far as the height of the continuous protrusions 5A in FIG. 6 is concerned, a first continuous protrusion 5A1 which is the outermost one is arranged taller than a second continuous protrusion 5A2 which is located radially inward such that arranging the individual seal strips 3 into an annular shape results in a specified clearance gap between successive seal strips 3 at the free-end edge portion 15. That is, a preferable situation of the specified clearance gap is that successive seal strips 3 will lightly abut against each other at the free-end edge portion 15 or will maintain a minute clearance gap thereat. Since the specified clearance gap can be adjusted by choosing the height of the protrusions 5 according to the inner and outer diameters of the strip brush seal 2, the arrangement of the seal brushes 3 with a gap accommodation can be easily done.

FIG. 6 illustrates an oblique view of an annularly-arranged strip brush seal 2 before the completion of assembly which appears like FIG. 3 after the completion. The left figure of FIG. 6 illustrates how the strip brush seal 2 is arranged while the right figure shows a single piece of seal strip 3. Individual seal strips 3 as shown in the right figure are placed one after another on the segment block of the strip brush seal 2 shown in the left figure. The mounting portion 4 retains two threads of continuous protrusions 5A thereon consisting of the first continuous protrusion 5A1 and the second first continuous protrusion 5A2 each of which is fabricated by bending in order to form a protruding ridge on the arranged surface. The continuous protrusions 5A have a cross section of a circular arc or semi-circle.

Width of the mounting portion 4 is set larger than that of the seal portion 6 such that the whole seal strip 3 is "T"-shaped. The height dimension of the first continuous protrusion 5A1 in the mounting portion 4 is denoted by "H". Also the height dimension of the second continuous protrusion 5A2 is made smaller than "H" of the first continuous protrusion 5A1. A clearance gap between the successive arranged surfaces in the mounting portion 4 has a dimension "H", and a gap between the surfaces at the free-end edge 15 of the seal strip 3 is arranged such that the surfaces lightly come in contact or in close proximity with each other. Such a choice of dimensions with respect to the gap between the arranged surfaces of the seal strips 3 makes possible the elastic deformation of the seal strip 3.

Inclination angle of the seal strip 3 is determined based on the rotational speed of the shaft 60, the magnitude of excursions of the shaft 60, and vibration of the shaft 60. The angle used for the strip brush seal 2 in FIG. 3 is adopted as an example. The angle of the seal strip 3 is in the range of from 30 to 45 degrees relative to the radial direction. Also the seal strip 3 has a rectangular form.

And longitudinal dimensions of the rectangular seal strip 3 is that the mounting portion 4 is in the range of from 5 to 10 mm and the seal portion 13 is in the range of from 30 to 50 mm. Also the width of the rectangle is in the range of from 3 to 10 mm. Thickness of the seal strip 3 in use is in the range of from 0.05 to 0.5 mm, more preferably from 0.08 to 0.3 mm. These dimensions are determined depending on the size of a strip brush seal 1, and a larger brush seal 1 required a larger seal strip 3 accordingly. Also the higher the fluid pressure becomes, the larger the width necessarily becomes. The seal strip 3 is made of steel sheet, stainless sheet, nickel-based alloy, ceramics sheet or the like.

Figure 7:
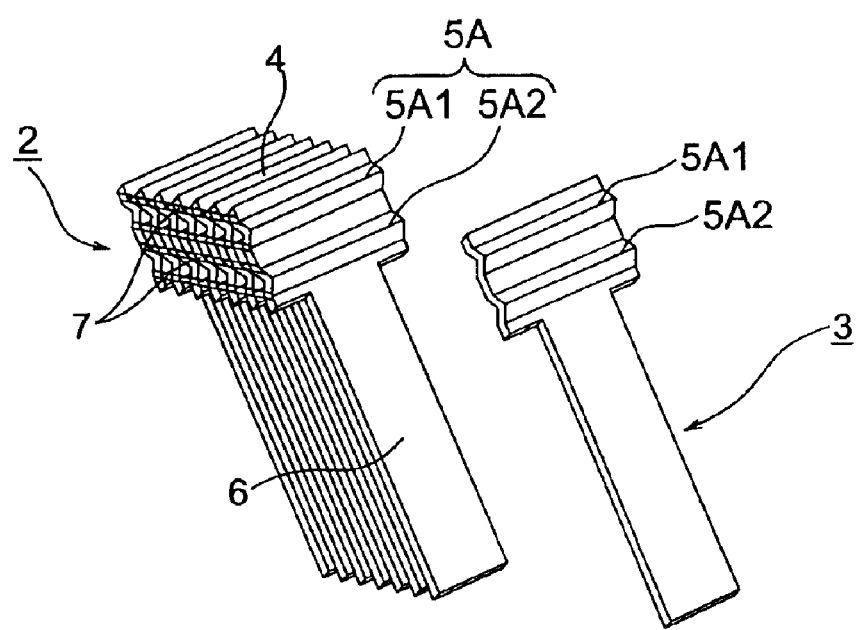
FIG. 7 is an oblique view of a segment block of a strip brush seal as a second example according to the present invention.

Strip brush seal 2 in FIG. 7 is a second example of the present invention. Strip brush seal 2 shown in FIG. 7 has a similar arrangement to the strip brush seal 2 of FIG. 6. The strip brush seal 2 of FIG. 7 differs from the strip brush seal 2 of FIG. 6 in that the cross section of a continuous protrusion 5A of the strip brush seal 2 has a triangular shape. The cross section of the continuous protrusion 5A can be made a trapezoidal shape. Then the side surface of the mounting portion 4 is welded along the continuous protrusion 5A, which defines a joint portion 7.

Figure 8:
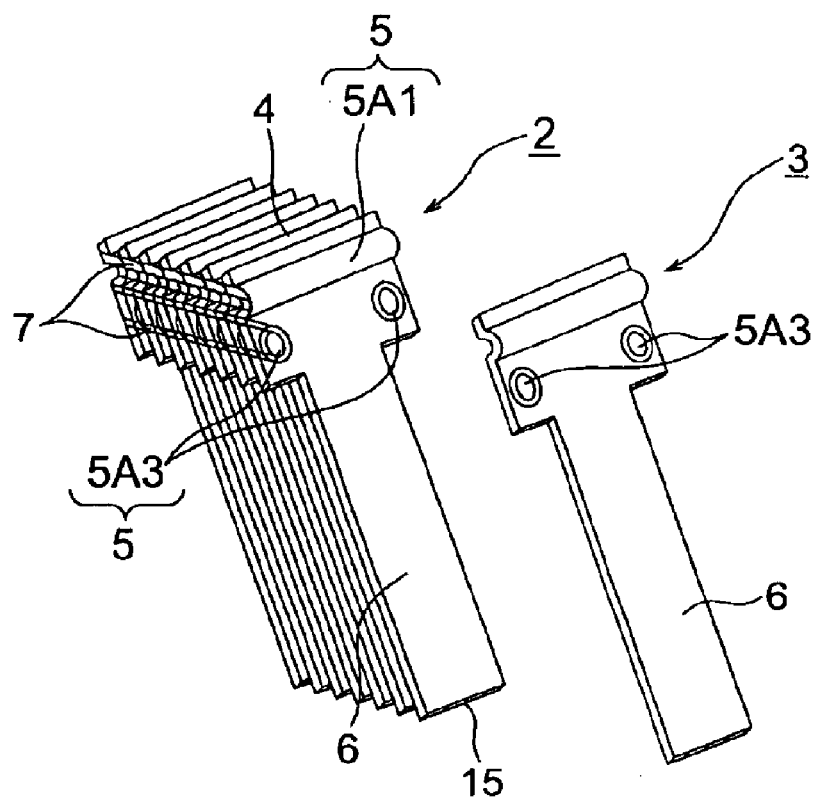
FIG. 8 is an oblique view of a segment block of a strip brush seal as a third example according to the present invention.

Strip brush seal 2 in FIG. 8 is a third example of the present invention. Strip brush seal 2 shown in FIG. 8 has a similar arrangement to the strip brush seal 2 of FIG. 6. The strip brush seal 2 of FIG. 8 differs from the strip brush seal 2 of FIG. 6 in that a first continuous protrusion 5A1 of the strip brush seal 2 in FIG. 8 has a cross section of a circular arc or semi-circle. Also second protrusions 5A3 whose cross section is trapezoidal or circular are disposed at two lateral ends of the mounting portion 4. Then the side surface of the mounting portion 4 is welded along the first continuous protrusion 5A1 and second protrusion 5A3, which defines a joint portion 7.

Figure 9:
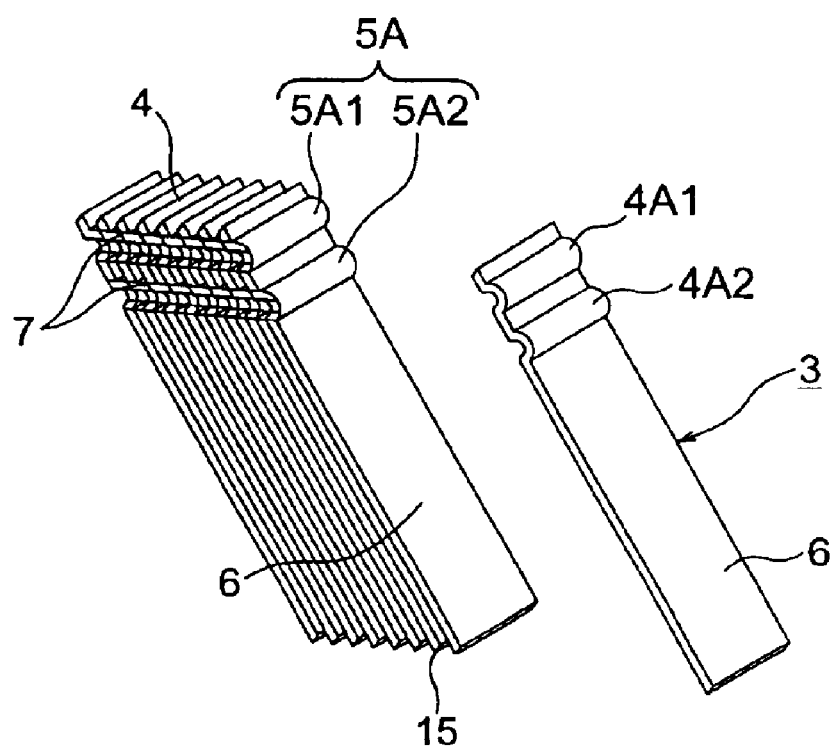
FIG. 9 is an oblique view of a segment block of a strip brush seal as a fourth example according to the present invention.

Strip brush seal 2 in FIG. 9 is a fourth example of the present invention. Strip brush seal 2 shown in FIG. 9 has a similar arrangement to the strip brush seal 2 of FIG. 6. The strip brush seal 2 of FIG. 9 differs from the strip brush seal 2 of FIG. 6 in that a mounting portion 4 of the strip brush seal 2 in FIG. 9 has more or less the same width as that of the seal portion 6. The strip brush seal 2 in FIG. 9 is advantageous when the length and width of the seal strip 3 is relatively large. More particularly, the advantage is substantial in case of a large width. Then the side surface of the mounting portion 4 is welded along the first continuous protrusion 5A1 and second protrusion 5A3, which defines a joint portion 7.

Figure 10:
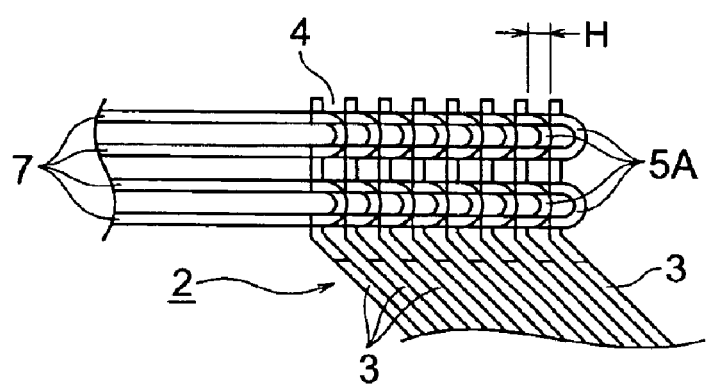
FIG. 10 is a side view of a portion of a joint portion in which the side surfaces of the individual protrusions in the mounting portion are successively welded and there is an inflection point between the mounting portion and the seal portion.

FIG. 10 shows a portion in the vicinity of the mounting portion 4 of a strip brush seal 2 wherein a joint portion 7 is formed by welding both of the side surfaces of protrusions 5 disposed on the orderly arranged seal strips 3 (only the joint portion 7 is extended toward the left). The seal strip 3 of the strip brush seal 2 is bent by press-forming at the boundary of the mounting portion 4 and the seal portion 6.in order to create a specified angle for the seal strip 3 of the seal portion 6. The bending angle of the seal strip 3 of the seal portion 6 is in the range of from 28 to 45 degrees with respect to the radial direction. As far as the cross section of the continuous protrusion 5A is concerned, the tip is semi-circularly-shaped and its inner shape is relatively a prolonged groove.

The individual seal strips 3 of the mounting portion 4 are arranged along radial directions. In the protrusions 5A of the individual mounting portion 4 thus arranged, a protruding outer surface of one of the mutually opposed protrusions 5A engages with a concave inner surface formed inside the groove of the other mating protrusion 5A. Having the engagement at the individual protrusions 5A not only produces four threads of welding portion on both side surfaces but also establishes a mounting portion 4 as a firm, integral body by means of forming a welded joint portion 7. For the strip brush seal 2 of FIG. 10, a clearance gap between the arranged surfaces at the seal portion 6 side, can be arbitrarily designed by making the height dimension of the second continuous protrusion 5A2 smaller than that of the first continuous protrusion 5A1 (refer to FIG. 11 as well). Other arrangements are more or less the same as in the first example.

Figure 11:
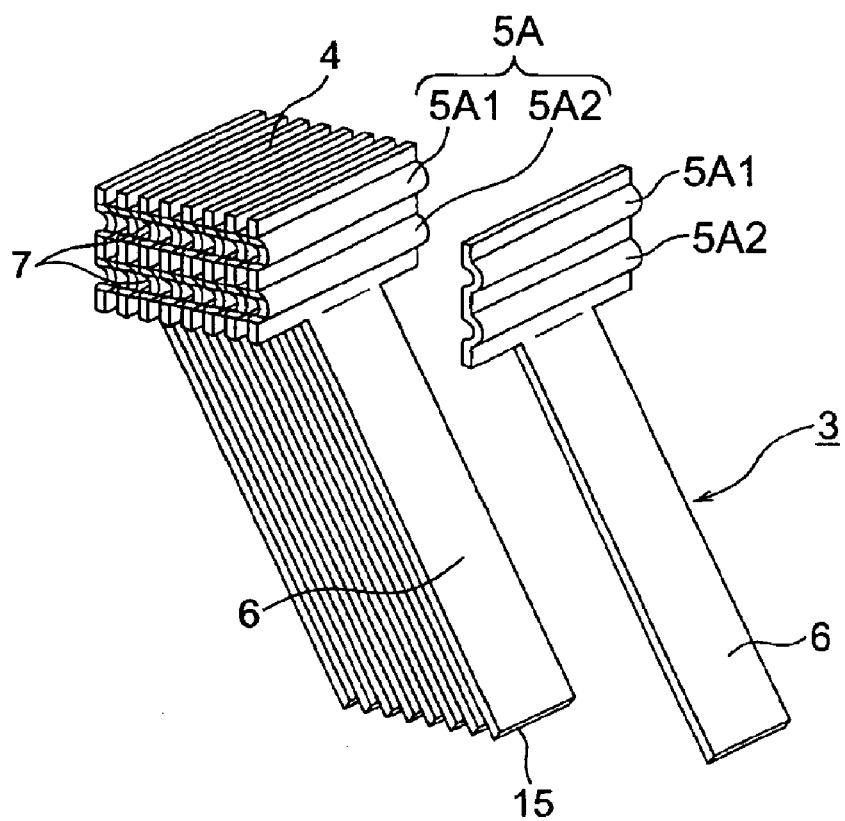
FIG. 11 is an oblique view of a segment block of a strip brush seal as a fifth example according to the present invention.
Figure 12:
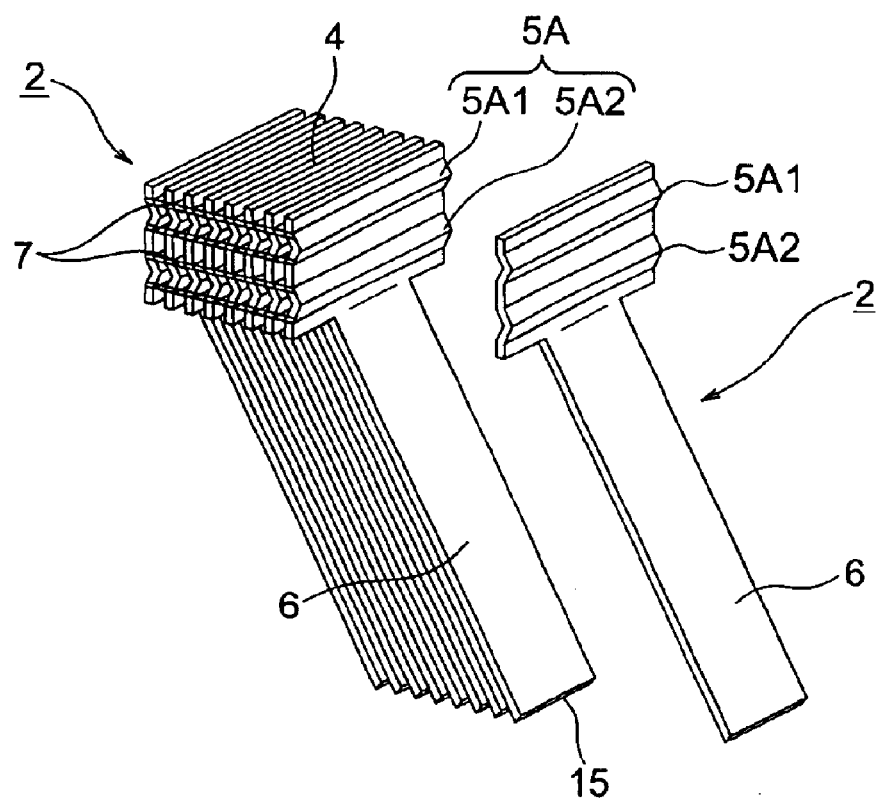
FIG. 12 is an oblique view of a segment block of a strip brush seal as a sixth example according to the present invention.
Figure 13:
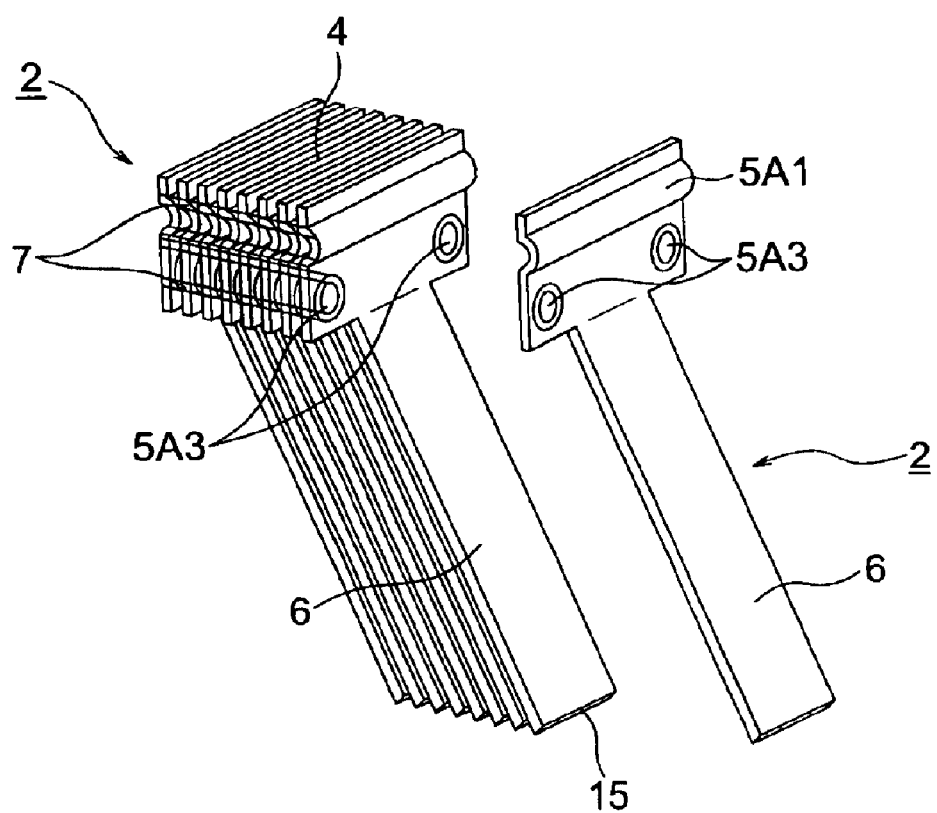
FIG. 13 is an oblique view of a segment block of a strip brush seal as a seventh example according to the present invention.
Figure 14:
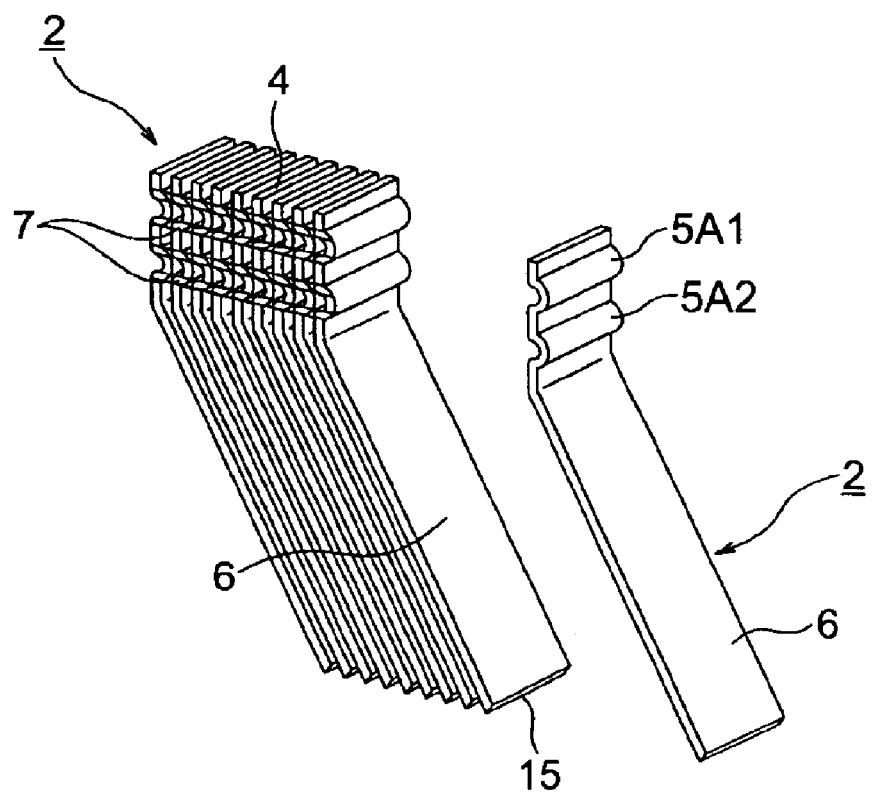
FIG. 14 is an oblique view of a segment block of a strip brush seal as an eighth example according to the present invention.
Figure 15:
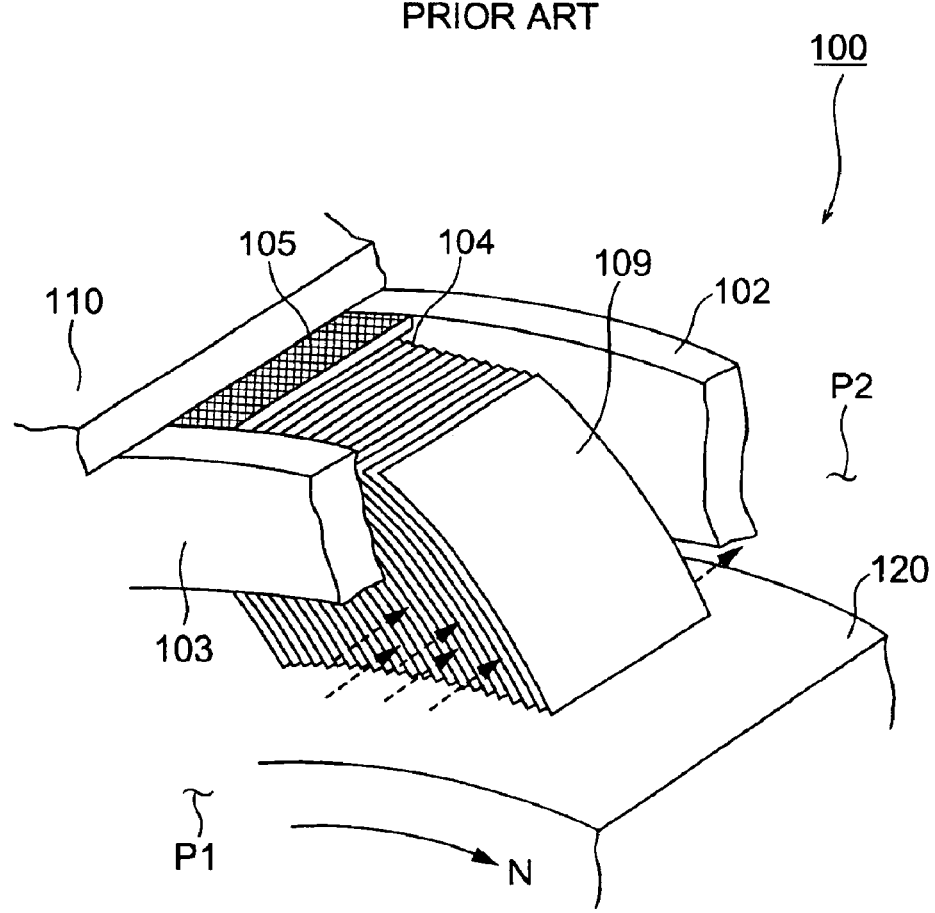
FIG. 15 is an oblique view of a strip brush seal of the related art.
Figure 16:
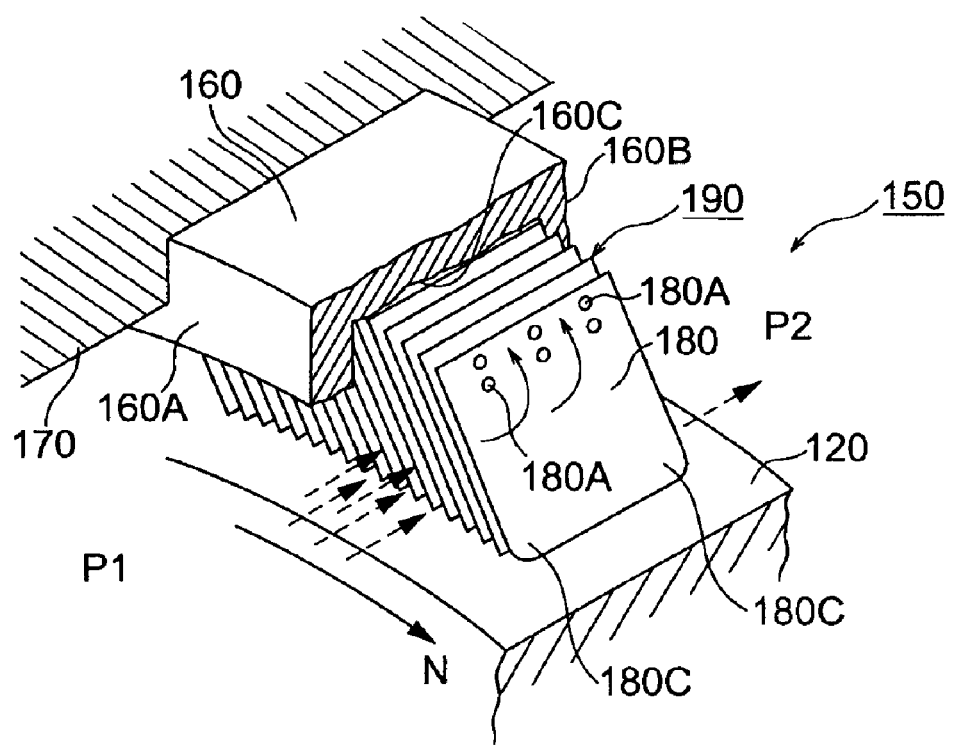
FIG. 16 is an oblique view of a strip brush seal of an alternative related art.

FIG. 11 is a fifth example. FIG. 12 shows a sixth example. FIG. 13 is a seventh example. FIG. 14 then is an eighth example. In the strip brush seals given in FIG. 11 through FIG. 14, the seal portion 6 makes an angle relative to the mounting portion 4 by being bent at an inflection point between the seal portion 6 and the mounting portion 4. Other than that, the strip brush seal 2 of FIG. 11 has a similar arrangement to that of FIG. 6. Likewise the strip brush seal 2 of FIG. 12 has a similar arrangement to that of FIG. 7, FIG. 13 is similar to FIG. 8, and also FIG. 14 is similar to FIG. 9. Namely the above mentioned correspondence between FIG. 11 through FIG. 14 and FIG. 6 through FIG. 9, respectively, indicates that the form of the protrusions 5 for the corresponding figure pairs is more or less the same. Then the side surface of the mounting portion 4 is welded along the first continuous protrusion 5A1, the second continuous protrusion 5A2 or the second protrusion 5A3, which constitutes a joint portion 7.

Strip brush seal device 1 equipped with the strip brush seal 2 as shown in FIG. 10 through FIG. 14, has a similar arrangement to that of FIG. 1. Therefore they are not shown in figures. A way to install the strip brush seal 2 of FIG. 10 through FIG. 14 is also more or less the same as the strip brush seal 2 of the first example. In the strip brush seal device 1, just like FIG. 1, a ring-shaped back plate 16 which makes a small clearance against the strip brush seal 2 is disposed at the opposite side relative to the surface of the strip brush seal 2 which a fluid pressure acts on. This back plate 16 consists of an outer perimeter portion 16A and a back face 16B; the outer perimeter portion 16A is joined together with the mounting portion 4 of the strip brush seal 2 and the back face 16B provides a support for the strip brush seal 2 when the fluid pressure acts on the strip brush seal 2. Therefore the back face 16B prevents deformation of the strip brush seal 2 against the fluid pressure and maintains a clearance gap between the orderly arranged strip surfaces. The back face 16B also provides a seal-tight support against the fluid. The back face 16B is made of steel plate, stainless plate, cupper plate, aluminum plate or the like.

As opposed to the back face of the back plate 16 giving a support to the strip brush seal 2, a retainer plate 10 is disposed in the front side facing the fluid. The retainer plate 10 has an annular shape whose radial dimension is shorter than the back plate 16. The retainer plate 10 cooperates with the back plate 16 for holding the strip brush seal 2 from the both sides thereof. The retainer plate 10 is also made of a similar material to those used for the back plate 16.

The joint portion 7 joining the mounting portion 4 of a strip brush seal is integrally formed by means of soldering, electron beam, or alternative welding method. The radial length of the retainer plate 10 will be sufficient if it is long enough to cover and hold a mounting portion 4 and to define a fixing portion 20. It, however, can be made to have a similar radial length to the back plate 6. In case that the retainer plate 10 has a similar radial length to the back plate 6, there should preferably dispose a clearance gap between the strip brush seal 2 and the retainer plate 10 such that the seal strips 3 can freely move.

Although materials for the back plate 16 and the retainer plate 10 can be chosen as described above, the choice of a material should preferably be done in accordance with the thermal expansion ratio of the housing 50. For example, a nickel-based alloy or other non-ferrous metal may also be used. Furthermore the type and temperature of the process fluid in use and other conditions depending on its application domain will affect the selection process of materials.

In FIG. 1, the free-end edge surface 15 fits the shaft 60 with a clearance gap of approximately 0.02 mm therebetween at the level shown by a solid line along the full circumference. Dotted line represents a range of excursions by the shaft 60. The strip brush seal 2 effects a seal at the seal portion 6 against the fluid. This strip brush seal device 1 disposes the seal strips 3 such that the direction of the width of strip coincides with a direction of action of the fluid. This provides a substantial sustainability against the fluid pressure, and forces caused by excursions of the rotary shaft 60 are absorbed by the elastic deformation of thin, flexible strips. Therefore the strip brush seal 2 not only exhibits a significant seal capability but also prevents wear due to friction by means of flexible adaptation against excursions of the rotary shaft 60.

In addition a clearance gap between the arranged surfaces at the free-end edge side 15 can be adjusted narrow and the seal strips 3 are made of a thin sheet. A fluid acted on the seal strips 3 induces an elastic deformation of the seal strips so as to shut a lower pressure P2 side, which secures a seal against the fluid. Also the joint by means of the continuous protrusions 5A effectively prevents the fluid from leaking through the mounting portion 4 in a radially outward direction.

Described below is an alternative embodiment related to the present invention.

In a strip brush seal device 1 of a second embodiment related to the present invention, a protrusion 5 is disposed as a continuous protrusion 5A along the full span of width of the mounting portion 4.

In the strip brush seal device 1 related to the second embodiment, producing a semi-spherical protrusion on the seal strip 3 is difficult since the strip 3 is very thin. Also a joint process during the assembly causes another difficulty. However, bending a seal strip 3 to fabricate a continuous protrusion 5A can be easily done despite a thin thickness of the seal strip 3. In addition such continuous protrusions 5A provide a stable contact along the width when individual seal strips 3 are orderly arranged. Also the reinforcement effect of bending at the protrusion 5 prevents a thermal deformation due to a welding heat thereat and maintains an inter strip gap for the seal portion 6 constant. Furthermore leakage of a fluid through the inter strip gap in a radially outward direction of the strip brush seal 2 can be prevented by the joint at the continuous protrusion 5A.

Since continuous protrusions 5A disposed in the mounting portion 4 can be successively arranged a fluid located to the seal portion 6 side is effectively prevented from leaking toward an outer circumferential direction of the mounting portion 4. In this way an annularly-shaped strip brush seal 2 can easily be assembled and be reduced in its assembly cost by introducing block-wise manufacturing wherein the whole annular shape of the strip brush seal 2 is divided into four or eight equally segmented blocks and the individually fabricated and sub-assembled blocks are joined and assembled to produce the final annular shape.

In a strip brush seal device 1 of a third embodiment related to the present invention, a joint portion 7 of a strip brush seal 2 fixes successive strip surfaces at the inner circumference of a seal portion 6 so as to lightly abut with each other or to come in close proximity relative to each other.

In the strip brush seal device 1 relative to the third embodiment, when seal strips 3 are disposed around a rotary shaft 60 to form an annularly shape successive strip surfaces located at the inner circumference of the seal portion 6 lightly abut with each other or come in close proximity relative to each other. If the protrusions 5 are designed and welded to form a joint portion 7 such that a specific inter strip gap is achieved the inter strip gap can easily be adjusted to a smaller one. Also welding of the protrusions 5 disposed on the arranged surface of the mounting portion 4 is provided on the side edge of the mounting portion 4. The welding therefore does not cause any deformation to the orderly arranged strip surfaces and does give an easy means of joining. Consequently the small inter strip gap of the seal strips 3 in the seal portion 6 can improve the seal capability.

Furthermore a gradually widening gap from the free ends 15 toward the direction of the mounting portion 4 enhances a flexibility of the seal portion 6.

In a strip brush seal device 1 of a fourth embodiment related to the present invention, protrusions 5 consists of a first continuous protrusion 5A1 which spans the width of the strip and a second protrusion 5A3 which is disposed toward a seal portion 6 side relative to the first continuous protrusion 5A1 and whose height is smaller than that of the first continuous protrusion 5A1.

In the strip brush seal device 1 relative to the fourth embodiment, the first continuous protrusion 5A1 located in the outer perimeter side of the individual seal strips 3 prevents a tilt of a mounting portion 4 in the width direction by coming in contact with successive opposing surfaces. Also the second protrusion 5A3 which is made smaller in height than the first continuous protrusion 5A1 located in the outer perimeter side of the seal strips 3 and is joined with successive opposing surfaces, is capable of maintaining a tiny inter strip gap for the seal strips 3 of the seal portion 6. In this way the tiny inter strip gap of the seal portion 6 can improve the seal capability. Furthermore the inter strip gap gradually increasing in a direction from the free end 15 to the mounting portion 4 is effectively capable of providing the ability of elastic deformation and preventing frictional wear due to contact against the rotary shaft 60.

In a strip brush seal device 1 of a fifth embodiment related to the present invention, the width of a mounting portion 4 is made larger than that of a seal portion 6.

In the strip brush seal device 1 relative to the fifth embodiment, since the width of the mounting portion 4 is larger than that of the seal portion 6 the installation of the mounting portion 4 to a mating part is made easy. Furthermore when the side surfaces of the mounting portions 4 whose width is larger than that of the seal portion 6 are welded for a fixing purpose the welding heat is effectively prevented from affecting the orderly arrangement of the seal strips 3. In addition even if the width of the mounting portion 4 is made relatively large for easy handling the width of the seal portion 6 can be chosen in such a way that the seal portion 6 exhibits a substantial flexibility because the width of the seal portion 6 can be arbitrarily chosen according to the fluid pressure in use. Also as an assembly is made easy by such an arrangement that the width of the mounting portion 4 can be made larger than that of the seal portion 6, the seal strips 3 used may be chosen to be extremely thin for further improving the flexibility of the seal strips 3.

By making the mounting portion 4 wider than the seal portion 6 of the seal strip 3, not only the installation of the strip brush seal 2 is made easy but also a secure installation of the mounting portion 4 can be achieved even with a narrow width of the seal portion 6. Also the welding on the successive protrusions 5 of the mounting portions 4 hardly causes uneven arrangement of the seal strips or thermal deformation. Consequently the seal capability of the seal portion 6 is improved, elastic deformation of the seal portion 6 is promoted, and wear due to contact with the rotary shaft 60 can be prevented.

Having described specific embodiments of the invention however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A strip brush seal device for effecting a seal between two relatively moving components, said strip brush seal device comprising:

a) a seal strip being made of a rectangular thin strip, the rectangular thin strip having protrusions thereon, said protrusions disposed at both ends along a direction of width of said thin strip:

b) a strip brush seal arranging a plurality of said seal strips in a successive manner by means of said protrusions of said seal strips being joined along the direction of arrangement:

c) a back plate being disposed on the opposite side of a process fluid, said fluid acting on said strip brush seal:

d) a mounting portion being disposed in said strip brush seal and having a joint portion wherein said strip brush seal is integrally welded with adjacent strip brushes along said protrusions: and e) a seal portion being disposed in said strip brush seal and located toward the radially inward relative to said mounting portion, the seal portion having a smaller inter strip gap than an inter strip gap disposed at said mounting portion.

2. A strip brush seal device as claimed in claim 1 wherein said protrusions are defined as continuous protrusions spanning the full width of said mounting portion.

3. A strip brush seal device as claimed in claim 1 wherein said joint portion of said strip brush seal is fixed such that the innermost strip surfaces of said seal portion come in contact or in close proximity with each other.

4. A strip brush seal device as claimed in claim 1 wherein said protrusions includes a first continuous protrusion and a second protrusion, the first continuous protrusion spanning the full width of said seal strip, the second protrusion being located toward said seal portion side relative to said first continuous protrusion and the height of said second protrusion being smaller than the height of said first continuous protrusion.

5. A strip brush seal device as claimed in claim 1 wherein the width of said mounting portion is larger than the width of said seal portion.

* * * * *